United States Patent
Agarwal et al.

(10) Patent No.: US 12,250,596 B2
(45) Date of Patent: Mar. 11, 2025

(54) UE IMPLEMENTATION TO MANAGE VONR/EPSFB CALLS

(71) Applicant: SAMSUNG ELECTRONICS CO., LTD., Suwon-si (KR)

(72) Inventors: Rishav Agarwal, Bangalore (IN); Danish Ehsan Hashmi, Bangalore (IN); Shanthossh Nagarajan, Bangalore (IN); Pratibha Kattemane Satyaganapati, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 352 days.

(21) Appl. No.: 17/947,768

(22) Filed: Sep. 19, 2022

(65) Prior Publication Data

US 2023/0091383 A1    Mar. 23, 2023

(30) Foreign Application Priority Data

Sep. 20, 2021   (IN) ................................ 20141042509

(51) Int. Cl.
| | | |
|---|---|---|
| *H04W 36/00* | (2009.01) | |
| *H04W 36/26* | (2009.01) | |
| *H04W 36/30* | (2009.01) | |

(52) U.S. Cl.
CPC ... *H04W 36/0022* (2013.01); *H04W 36/0058* (2018.08); *H04W 36/26* (2013.01); *H04W 36/302* (2023.05)

(58) Field of Classification Search
CPC ....... H04W 36/0022; H04W 36/00222; H04W 36/00224; H04W 36/00226; H04W 36/0058; H04W 36/0061; H04W 36/0066; H04W 36/0083; H04W 36/00837; H04W 36/0085; H04W 36/14; H04W 36/144; H04W 36/1443; H04W 36/26; H04W 36/30; H04W 36/302; H04W 36/304; H04W 36/34; H04W 36/36
See application file for complete search history.

(56) References Cited

U.S. PATENT DOCUMENTS

| | | | |
|---|---|---|---|
| 2018/0308509 | A1 | 10/2018 | Balasubramanian et al. |
| 2020/0112892 | A1 | 4/2020 | Shi et al. |
| 2020/0314702 | A1 | 10/2020 | Rahman |
| 2021/0136645 | A1 | 5/2021 | Zhao et al. |
| 2022/0046738 | A1 | 2/2022 | Challa et al. |

FOREIGN PATENT DOCUMENTS

| | | |
|---|---|---|
| CN | 113055856 | 6/2021 |
| CN | 112995212 | 7/2021 |
| WO | 2021/111414 | 6/2021 |

OTHER PUBLICATIONS

Indian Office Action issued Jul. 3, 2023 in corresponding Indian Patent Application No. 202141042509.

*Primary Examiner* — Matthew W Genack
(74) *Attorney, Agent, or Firm* — Nixon & Vanderhye, P.C.

(57) ABSTRACT

Embodiments herein disclose UE based implementations to manage voice/video over new radio (VoNR)/EPSFB calls. In an embodiment, there can be a zero CQI reporting for indicating a signal deterioration during the VoNR call. In an embodiment, at least one of a Wi-Fi network or a dual SIM dual standby (DSDS) feature, a UE initiated fallback procedure and an internet bearer can be used for continuing the VoNR call. Various embodiments may reduce the call failures and manage calls on VoNR/5G which can be useful to the UE in volatile signal conditions.

20 Claims, 13 Drawing Sheets

UE IMPLEMENTATION TO MANAGE VONR/EPSFB CALLS

CROSS REFERENCE TO RELATED APPLICATIONS

This application is based on and claims priority under 35 U.S.C. § 119 to Indian Provisional Patent Application No. 202141042509, filed on Sep. 20, 2021, in the Indian Patent Office, and to Indian Complete Patent Application No. 202141042509, filed on Sep. 13, 2022, in the Indian Patent Office, the disclosures of all of which are incorporated by reference herein in their entireties.

BACKGROUND

Field

The disclosure relates to voice/video over new radio (VoNR)/evolved packet system fallback (EPSFB) and, for example, the disclosure is related to manage call success rates in VoNR/EPSFB.

Description of Related Art

VoNR and EPSFB call services are being rolled out by operators and may become a major area of interest in terms of success and call quality in new radio standalone (NR-SA) coverages. Call success rate is a major key performance indicator (KPI) which governs the efficiency of the operator service. But, there are some crippling issues in VoNR and EPSFB which need to be addressed.

Currently, in voice over long-term evolution (VoLTE), when a call may not be connected for a few seconds, the user equipment (UE) triggers a circuit switched fallback (CSFB) and the call trial is redirected over an alternate means (such as legacy 3G or 2G systems), which dramatically improves the call success rate.

However while using VoNR on standalone 5G system, there is no such mechanism at the UE side to initiate an EPSFB or CSFB to 4G/3G. If a call fails to connect in NR network, the call will be disconnected and the user has to keep trying in the NR network only.

NR standards has no solution for 5G→4G or 5G→3G single radio voice call continuity (SRVCC) or 5G→4G→3G in implementation dependent time. Even if 5G to 3G is introduced, it is a poor solution for the UE to try call in 3G, if a good evolved universal terrestrial radio access (EUTRA) coverage is available for packet switched (PS) call, since PS call quality of experience (QOE) is significantly better than circuit switched (CS) call. For operators with large mm-wave coverage, the VoNR over frequency range (FR2) Stand-Alone is even more challenging, which requires UE implementations to improve call success rate.

FIG. 1A is a diagram illustrating an example scenario, where IP multimedia subsystem (IMS) signalling failures occur. The IMS signalling failures are very frequently observed in live networks for UEs. Due to poor signal quality (reference signals received power/reference signal received power/quality (RSRP/Q), signal-to-interference-plus-noise ratio (SINR), path-loss), poor downlink (DL)/uplink (UL) KPIs (like block error rate (BLER)), IMS stack delays, n/w response delays in session initiation protocol (SIP) signalling, etc., SIP messages get delayed and often IMS timers expire by then, resulting in call failures. Even though channel conditions are good, IMS signalling failures may happen due to lots of other server related reasons which may result in call fails and there needs to be a pro-active UE mechanism to deal with these issues immediately.

FIG. 1B is a diagram illustrating an example scenario, where a 5G core network (CN) congestion occurs. When the UE requests for an IMS quality of service (QOS) establishment or a protocol data unit (PDU) session establishment, access and mobility management function (AMF) or session management function (SMF) might be congested and might not respond to the UE's request. The UE keeps retrying on NR only, as there is no fallback (FB) mechanism supported. This is analogous to long-term evolution (LTE)'s mobility management entity (MME) congestion which happens very frequently. Also, many gNBs in a public land mobile network (PLMN) use a common AMF/SMF for signalling, due to which the call may likely to fail on neighbouring gNBs. This leads to an issue for VoNR success rates, if not tackled at the UE side.

FIG. 1C is a diagram illustrating an example scenario, where FR2 sensitivity issue occurs. Consider that the UE is latched to the NR-SA mm-wave and a VoNR call is triggered or ongoing. Most operators have large mm-wave coverage and due to that, VoNR will also be deployed over FR2 bands. The issue with having VoNR on mmW is, the FR2 spectrum is very sensitive and radio conditions vary even with orientations. So, the VoNR may get disconnected very often or call setup might also be affected in some cases. It is necessary for the UE to have a fallback implementation on detecting rapid beam signal deterioration. Further, line of sight (LOS) availability is a big factor, which affects the mm-wave connectivity. The way the UE is held during the call or non-line of sight (N-LOS) severely degrades beam signal strength which may affect call quality.

FIG. 1D is a diagram illustrating an example scenario, where there is a poor NR-SA coverage. This is the scenario where the UE is in mild/poor NR coverage, but having an excellent EUTRA coverage. There is not much difference in the QOE of VoLTE and VoNR, from the user perspective, since both are PS-based and use dedicated data radio bearer (DRBs). If NR-SA has poor network coverage with VoNR ongoing (without any data), there may be power loss possibilities like higher UL transmit (TX) power, bigger bandwidth (BW) monitoring, multiple retransmissions (ReTX), multiple radio link failures (RLF), and so on. This may not be an optimal way, especially if the UE has low battery and EUTRA has good coverage. In such scenarios, instead of waiting for inter radio access technology (IRAT) (B1/B2 event) handover (HO) to the LTE, the UE should have an implementation to initiate the EPSFB by itself to avoid power loss and last longer for call.

FIG. 1E is a flowchart illustrating an example scenario, where there is a poor EUTRA coverage during EPSFB. At 102, the UE is in NR-SA. When there is a poor NR-SA coverage, the UE initiates the EPSFB during which the UE reports available EUTRA frequencies with associated signals, as illustrated in step 104. The network re-directs the UE to a particular EUTRA frequency, as illustrated in step 106. The UE keeps trying to latch to that frequency, until the re-direction timer expires (wherein the timer is an implementation defined value, say 't' seconds), as illustrated in step 108. Even though the UE is pre-aware of poor EUTRA conditions while reporting it to the 5G network, the UE is helpless and may perform Attach procedure, etc. Even if the acquisition fails, the UE keeps trying for t seconds which delays the EPSFB and the call may either gets dropped or delayed. Therefore only after t seconds, the UE tries other cells or does CSFB, as illustrated in step 110. There is no such mechanism, where the UE is already aware of poor EUTRA coverage, and may request for a CSFB, thereby boycotting all the attempts on the poor EUTRA cell. Further, some other LTE cells may become better than the one UE has been redirected to within t seconds, but the UE may only know that after t seconds, which is bad in terms of time consumed.

Hence, there are multiple factors resulting in poor call success rate for mobile phones or operators. This can be significantly worsened in very volatile areas such as mmW cells, where signal conditions depend on many factors like Line of Sight. Even if the direction of the UE is changed a little, signal condition(s) might degrade drastically resulting in call failures.

SUMMARY

Embodiments of the disclosure reduce the call failures and manage calls on Voice/Video over New Radio (VoNR)/5G using UE based implementations which may be useful to the UE in volatile signal conditions.

Embodiments of the disclosure improve call success rates on VoNR based on channel state parameter(s) of the NR network.

Embodiments of the disclosure improve call success rates on VoNR using a Wi-Fi network and internet services.

Embodiments of the disclosure proved a UE initiated EPS fallback to LTE or legacy radio access technology (RAT) while the signal conditions are such that the call cannot be sustained.

Accordingly, example embodiments herein provide a UE and method for managing voice/video over new radio (VoNR) calls. The method comprises: detecting, by a user equipment (UE), a signal deterioration during a VoNR call based on at least one of absolute signal parameters and derived parameters; sending, by the UE, a zero channel quality indicator (CQI) report and a measurement report to a base station on detecting the signal deterioration, wherein the measurement report comprises at least one of at least one neighbour new radio (NR) cell information and at least one neighbour long-term evolution (LTE) cell information.

According to an example embodiment, the method may further comprise: receiving, by the UE, a handover trigger for the VoNR call from the base station based on the zero CQI report and the measurement report; and continuing, by the UE, at least one of the VoNR call over a neighbour NR cell, and the VoNR call as a voice over long-term evolution (VoLTE) call over a neighbour LTE cell, based on the handover trigger for the VoNR call.

Accordingly, example embodiments herein provide a UE configured to detect the signal deterioration during the VoNR call based on the absolute signal parameters and/or derived parameters. The UE is configured to send the zero CQI report and the measurement report to the base station on detecting the signal deterioration. The UE is further configured to receive the handover trigger for the VoNR call from the base station and continue at least one of the VoNR call and the VoLTE call, based on the handover trigger for the VoNR call.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the spirit thereof, and the embodiments herein include all such modifications.

BRIEF DESCRIPTION OF THE DRAWINGS

Embodiments herein are illustrated in the accompanying drawings, throughout which like reference letters indicate corresponding parts in the various figures. Further, the above and other aspects, features and advantages of certain embodiments will be more apparent from the following detailed description, taken in conjunction with the accompanying drawings, in which.

DETAILED DESCRIPTION

Figure 1A:
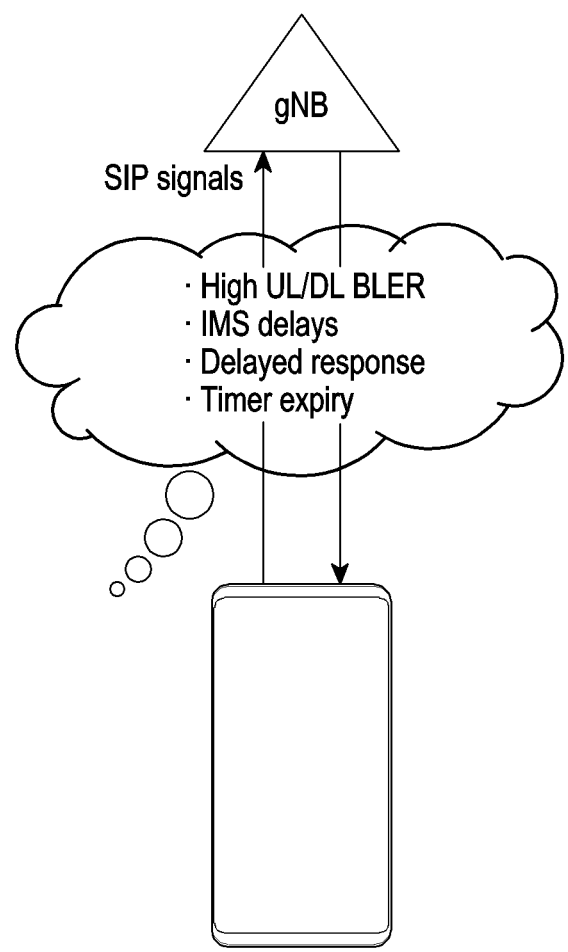
FIG. 1A is a diagram illustrating an example scenario, where IMS signalling failures occur, according to the prior art.
Figure 1B:
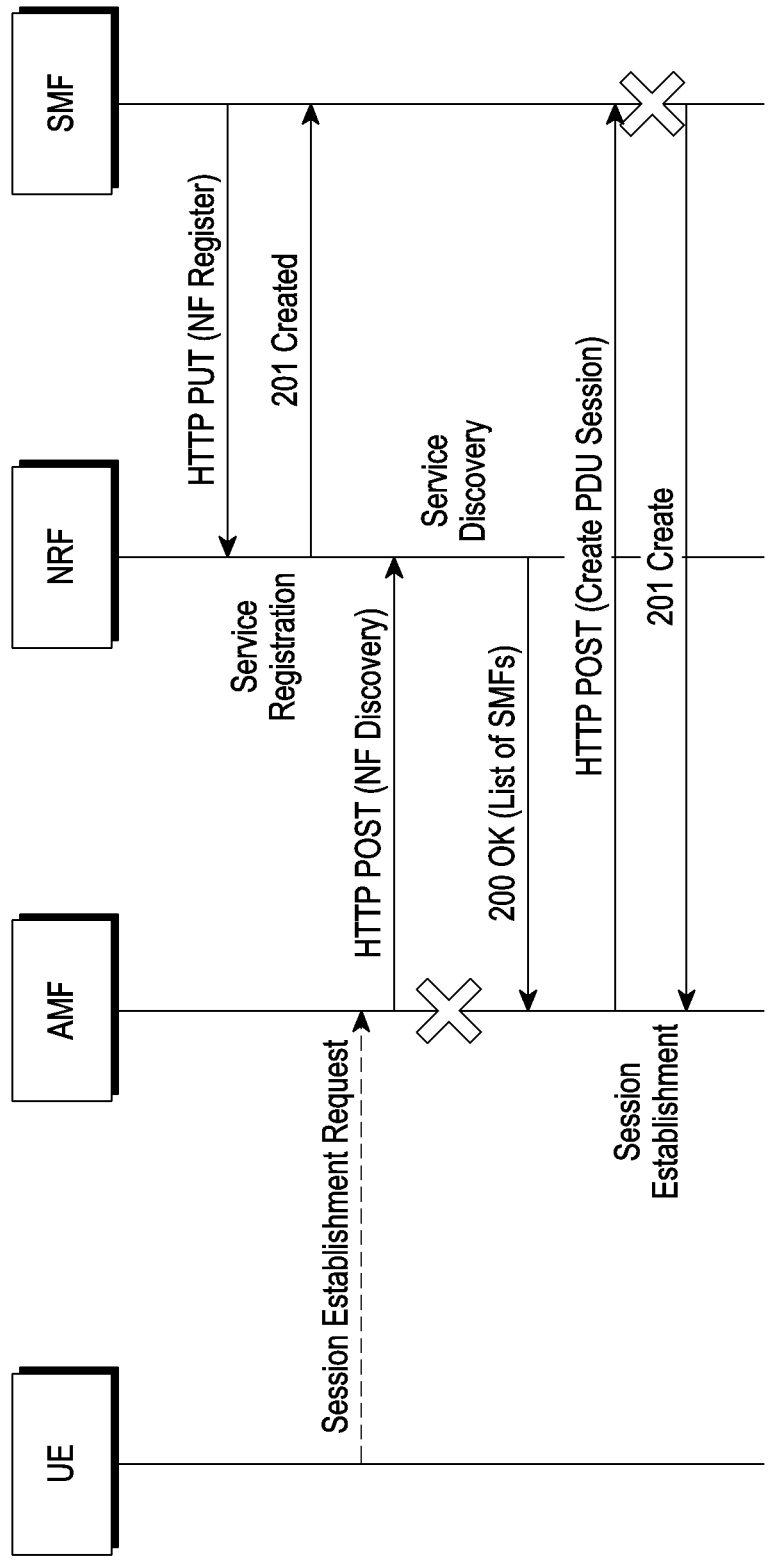
FIG. 1B is a diagram illustrating an example scenario, where 5G Core Network congestion occurs, according to the prior art.
Figure 1C:
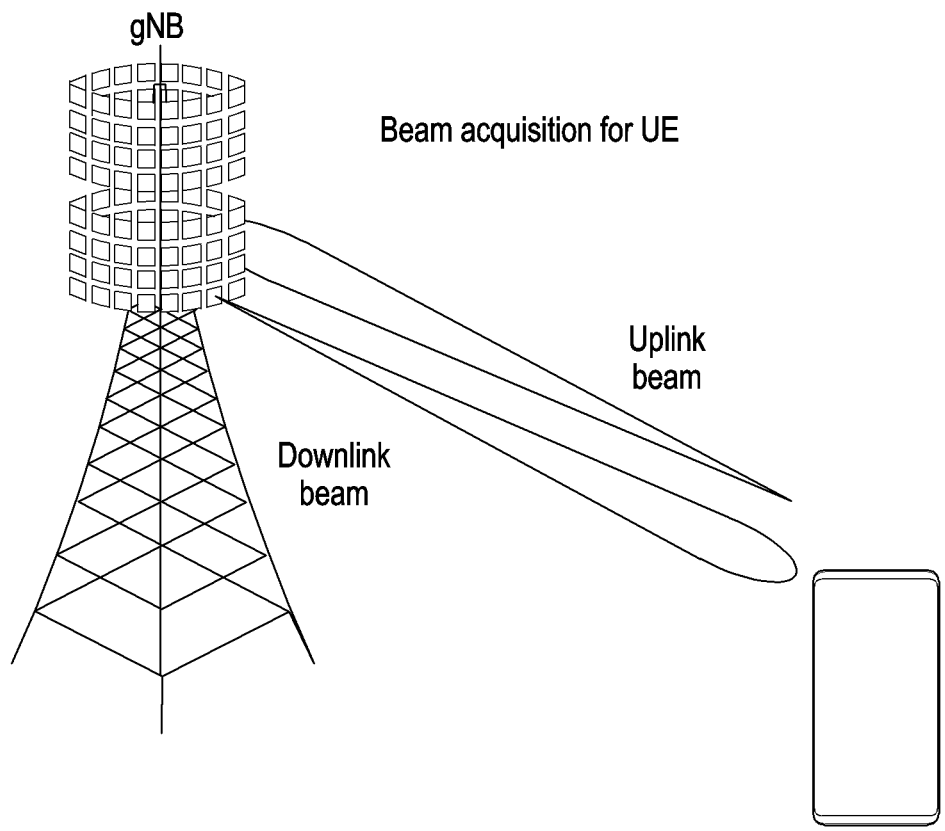
FIG. 1C is a diagram illustrating an example scenario, where FR2 sensitivity issue occurs, according to the prior art.
Figure 1D:
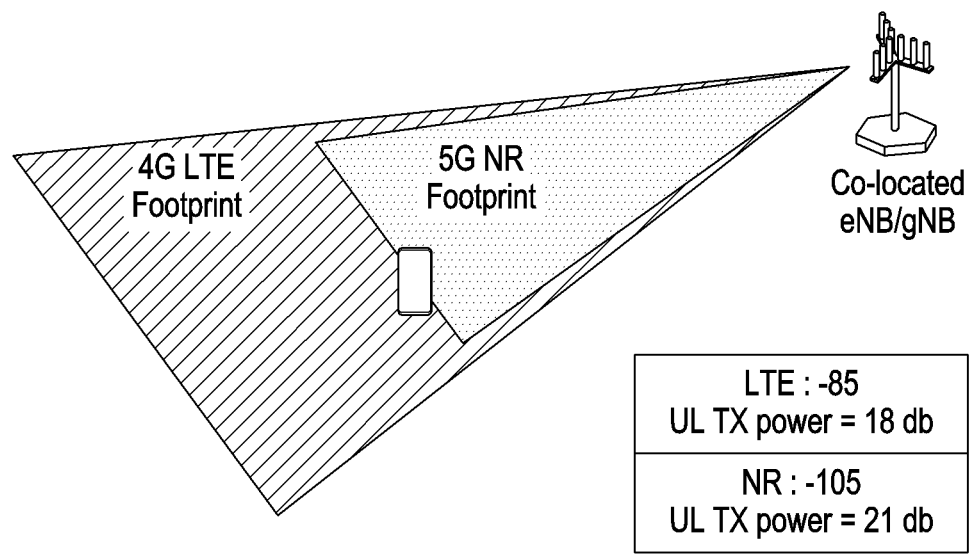
FIG. 1D is a diagram illustrating an example scenario, where there is a poor NR-SA coverage, according to the prior art.
Figure 1E:
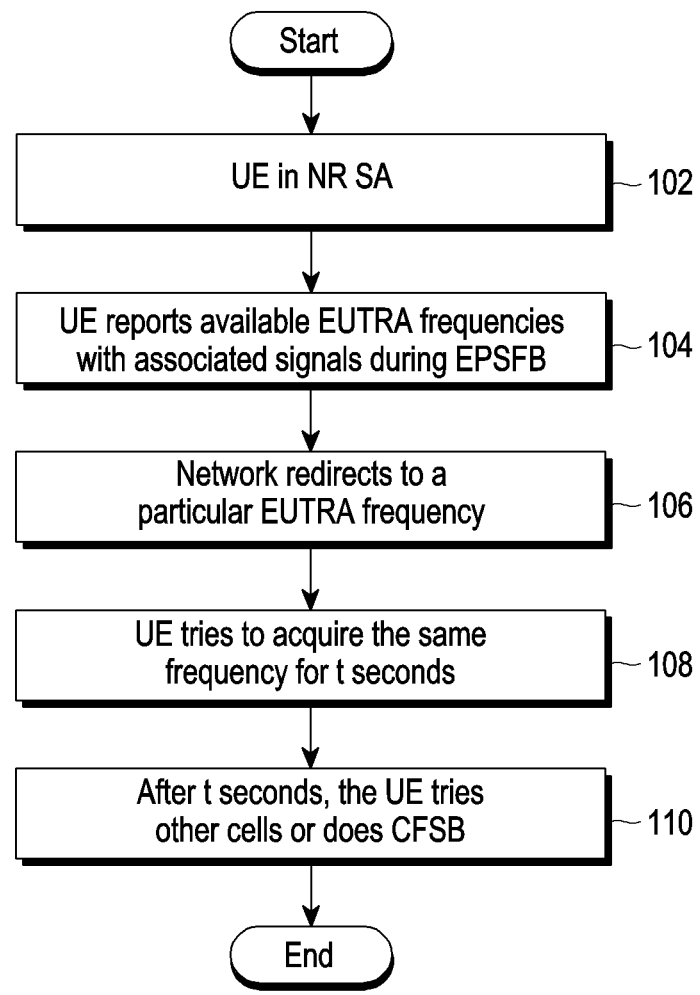
FIG. 1E is a flowchart illustrating an example scenario, where there is a poor EUTRA coverage during EPFSB, according to the prior art.

The various example embodiments herein and various features and advantageous details thereof are explained more fully with reference to the non-limiting embodiments that are illustrated in the accompanying drawings and detailed in the following disclosure. Descriptions of well-known components and processing techniques may be omitted so as to not unnecessarily obscure the disclosure herein. The examples used herein are intended merely to facilitate an understanding of ways in which the embodiments herein may be practiced and to further enable those of skill in the art to practice the embodiments herein. Accordingly, the examples should not be construed as limiting the scope of the disclosure.

The embodiments herein achieve UE based implementations to enhance call success rates in VoNR/EPSFB. Referring now to the drawings, and more particularly to FIGS. 2 through 8B, where similar reference characters denote corresponding features consistently throughout the figures, there are shown various example embodiments.

Figure 2:
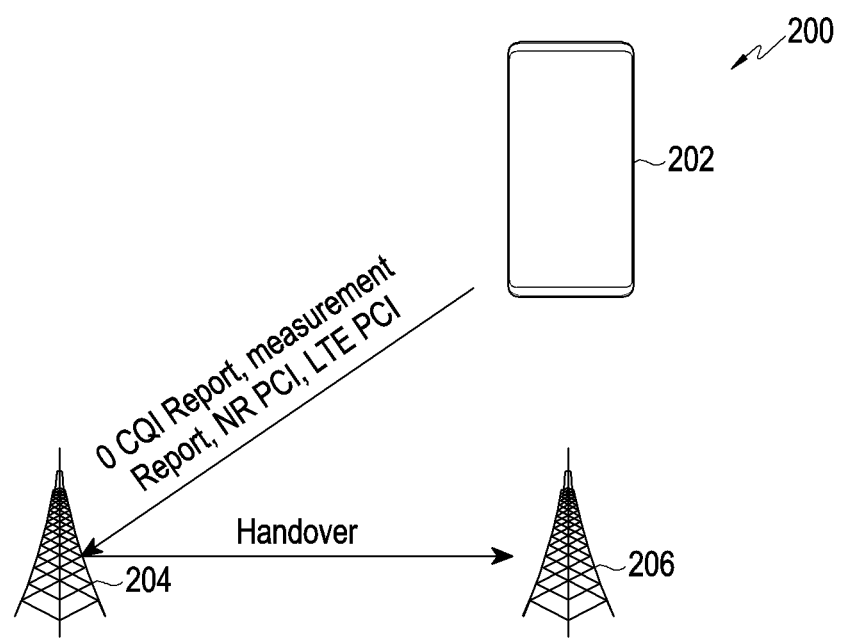
FIG. 2 is a diagram illustrating an example system for managing voice/Vvdeo over new radio (VoNR) calls, according to various embodiments.

FIG. 2 is a diagram illustrating an example system 200 for managing voice/video over new radio (VoNR) calls according to various embodiments. The system 200 comprises at least one UE 202, a base station 204, and at least one neighbour cell 206.

In an embodiment, the UE 202 is configured to detect a signal deterioration during a VoNR call based on at least one of absolute signal parameters and derived parameters. Examples of the absolute signal parameters may be, but not limited to a reference signals received power (RSRP), a reference signal received quality (RSRQ), a signal-to-interference-plus-noise ratio (SINR) etc. Examples of the derived parameters may be, but not limited to a block error rate (BLER), path-loss, etc.

The UE 202 is configured to send a measurement report and a zero channel quality indicator (CQI) report to the base station 204 on detecting the signal deterioration. The measurement report may comprise at least one of at least one neighbour new radio (NR) cell information, and at least one neighbour long-term evolution (LTE) cell information, or a combination of both. The neighbour NR cell information may be, but not limited to a NR physical cell identifier (PCI). The neighbour LTE cell information may be, but not limited to a LTE PCI.

The CQI is a channel state information (CSI) parameter, where the CSI parameter is related to the state of a channel. The UE 202 measures the CSI parameter using a reference signal and reports the measured CSI parameter to the base station 204 as a feedback. The CQI is a 4-bit value that indicates the channel quality. The CQI provides information about the highest modulation scheme and the code rate (MCS) suitable for the downlink transmission to properly able to decode data without BLER for given channel conditions. Thus, zero CQI indicates the poorest channel quality.

The UE 202 is configured to receive a handover trigger for the VoNR call from the base station 204, based on the zero CQI report and the measurement report. The UE 202 is further configured to continue the call as the VoNR call or the VoNR call as a voice over long-term evolution (VoLTE) call, based on the handover trigger for the VoNR call. The VoNR call may be connected over a neighbour NR cell, and the VoLTE call may be connected over a neighbour LTE cell.

In an embodiment, the UE 202 is configured to continue at least one of the VoNR call and the VoLTE call using at least one of a UE initiated fallback (FB) procedure, a Wi-Fi network or a dual SIM dual standby (DSDS) feature, and an internet bearer.

In an embodiment, the base station 204 is configured to receive the zero CQI report and the measurement report from the UE 202 which indicate the signal deterioration during the VoNR call. The base station 204 is further configured to trigger handover or redirection or any type of connected mode mobility of the UE 202 to at least one neighbour cell 206 e.g., to handover the VoNR call to at least one of the neighbour NR cell and the neighbour LTE cell based on the measurement report and the zero CQI report. The base station 204 may be configured to handover the VoNR call based on the received at least one of the NR PCI and the LTE PCI.

FIG. 2 illustrates various example elements of the system 200, but it is to be understood that various embodiments are not limited thereon. In various embodiments, the system 200 may include less or a greater number of elements/units.

Further, the labels or names of the units are used only for illustrative purpose and does not limit the scope of the embodiments herein. One or more units may be combined together to perform same or substantially similar function in the system 200.

Figure 3:
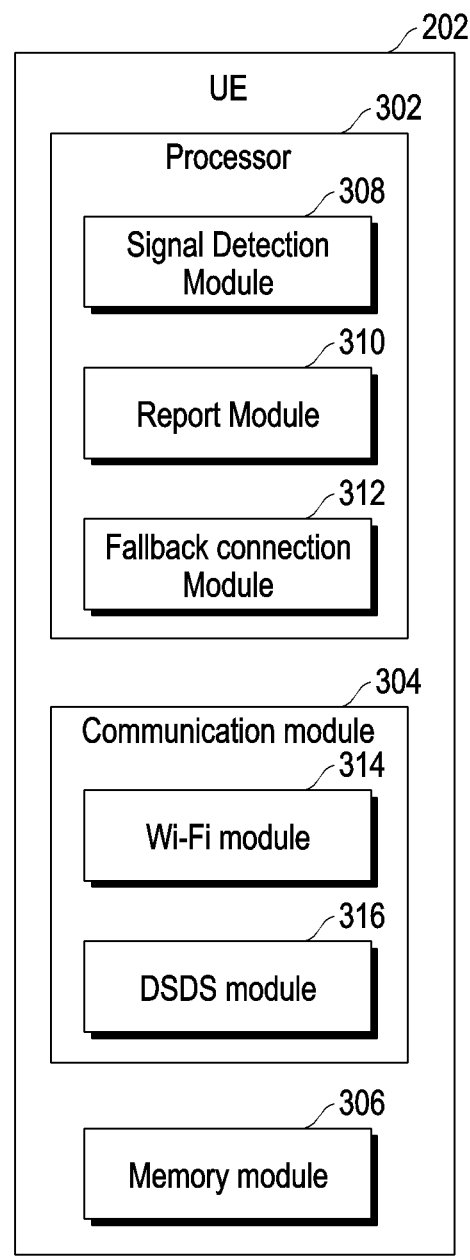
FIG. 3 is a block diagram illustrating an example configuration of a UE for managing the VoNR calls, according to various embodiments.

FIG. 3 is a block diagram illustrating an example configuration of a UE 202 configured for managing the VoNR calls according to various embodiments. The UE 202 comprises a processor (e.g., including processing circuitry) 302, a communication module (e.g., including communication circuitry) 304, and a memory module (e.g., including a memory) 306. The processor 302 further comprises a signal detection module 308, a report module 310, and a fallback connection module 312, each of which may include various processing circuitry and/or executable program instructions.

In an embodiment, the processor 302 may include various processing circuitry and may be configured to detect the signal deterioration during the VoNR call and send the measurement report and the zero CQI to the base station 204 through the communication module 304, based on the detection of the signal deterioration.

In an embodiment, the signal detection module 308 of the processor 302 may be configured to detect the signal deterioration if the VoNR call is not getting established on the NR cell within the expiry of a timer 't'. In an embodiment herein, the signal detection module 308 may detect the signal deterioration based on the absolute signal parameters and/or derived parameters, wherein the parameters may be collected from the NR network during the VoNR call.

In an embodiment, the report module 310 may be configured to generate the measurement report and the zero CQI report based on the detection of the signal deterioration. The zero CQI report may be generated based on the configured CSI resources. The measurement report may comprise neighbour cell information such as the neighbour NR PCI or neighbour LTE PCI or a combination of both.

The report module 310 may be further configured to send the generated zero CQI report and the measurement report to the base station 204 via the communication module 304.

In an embodiment, the communication module 304 may include various communication circuitry through which the UE 202 and the base station 204 communicate may be in the form of either a wired network, a wireless network, or a combination thereof. The wired and wireless communication networks may comprise but not limited to, GPS, GSM, LAN, Wi-Fi compatibility, Bluetooth low energy as well as NFC. The wireless communication may further comprise one or more of Bluetooth, ZigBee, a short-range wireless communication such as UWB, a medium-range wireless communication such as Wi-Fi or a long-range wireless communication such as 3G/4G or WiMAX, according to the usage environment.

In an embodiment, the processor 302 may be at least one of a single processer, a plurality of processors, multiple homogeneous or heterogeneous cores, multiple central processing units (CPUs) of different kinds, microcontrollers, special media, and other accelerators. The processor 302 may be a general purpose processor, such as an application processor (AP), a graphics-only processing unit such as a graphics processing unit (GPU), a visual processing unit (VPU), and/or an artificial intelligence (AI)-dedicated processor such as a neural processing unit (NPU). The processor 302 is configured to execute instructions stored in the memory module 306.

In an embodiment, the memory module 306 of the UE 202 may include various memories and comprise one or more volatile and non-volatile memory components which are capable of storing data and instructions to be executed. Examples of the memory module 306 may be, but not limited to, NAND, embedded multi media card (eMMC), secure digital (SD) cards, universal serial bus (USB), serial advanced technology attachment (SATA), solid-state drive (SSD), and so on. The memory module 306 may also include one or more computer-readable storage media. The memory module 306 may include non-volatile storage elements such as magnetic hard discs, optical discs, floppy discs, flash memories, or forms of electrically programmable memories (EPROM) or electrically erasable and programmable (EE-PROM) memories. In addition, the memory module 306 may, in some examples, be considered as a non-transitory storage medium. The term "non-transitory" may indicate that the storage medium is not embodied in a carrier wave or a propagated signal. However, the term "non-transitory" should not be interpreted to mean that the memory module 306 is non-movable. In certain examples, a non-transitory storage medium may store data that may, over time, change (e.g., in random access memory (RAM) or cache).

Figure 4:
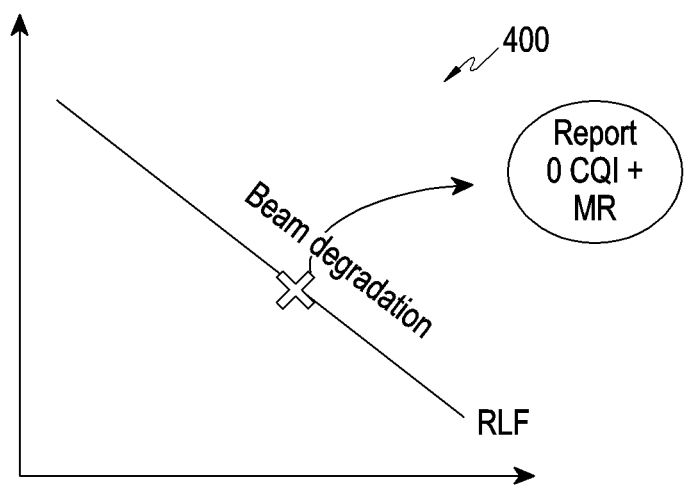
FIG. 4 is a graph illustrating an example scenario, wherein there is zero CQI reporting, according to various embodiments.

FIG. 4 is a graph illustrating an example scenario 400, wherein there is a zero CQI reporting according to various embodiments. On detecting at least one of:
a. a sudden and rapid signal/beam strength degradation; or
b. if the VoNR call or a 5G NR call is not getting established on the NR PCI within the first t' seconds of dialling (t' is implementation dependent),
the UE 202 may trigger the 0 CQI report along with an event based measurement report with details of available sub 6 NR PCIs and LTE PCIs so that the network may give a forced handover to a better cell if the VoNR is not established or ongoing. This is particularly essential in case of FR2 stand-alone (SA) where beams are very sensitive. The radio link failure (RLF) and re-establishment takes 2-3 seconds which may degrade the VoNR call quality.

In an embodiment herein, the UE 202 is configured to use a Wi-Fi stack. When the UE 202 is in poor NR coverage during the VoNR call or if the VoNR call is not getting established for the first 't' seconds even in a good NR coverage, and Wi-Fi coverage is available (which the UE 202 may connect to), the UE 202 may use the Wi-Fi instead of 3GPP nodes.

Timer 't' may be decided at the UE 202 based on average call success time in good signal conditions, average call success time in mid signal conditions and average call success time in weak signal conditions. The timer 't' may be decided based on call success rate on a particular cell overall or at a particular time of the day or a particular location. The data of the timer 't' may be stored on a server which may be accessible by multiple UEs. When the call success rate is lower than a predetermined (e.g., specified) value, lowest time is assigned to 't' and when the call success rate is higher than the predetermined value, the highest value of call success time is assigned to 't'.

The UE 202 may keep trying on cellular, if call establishment fails, which may be avoided using the Wi-Fi to trigger a Vo-WiFi call. Even if the cellular network is preferred and Vo-WiFi is a second preference, embodiments herein use the Vo-WiFi to maintain a QoE, if a fallback mechanism to other radio access technology (RAT) is not supported and VoNR is not getting established. There are provisions to route the call packets to a core network via evolved packet data gateway (ePDG), which the UE 202 may implement to use in such scenarios, provided the Wi-Fi coverage is available.

In an embodiment, the communication module 304 is configured to connect the VoNR call either to a Wi-Fi network using a Wi-Fi module 314 or to a preferred SIM using a DSDS module 318.

The communication module 304 is configured to utilize the Wi-Fi module 314 for verifying availability of the Wi-Fi network, on detecting the signal deterioration during the VoNR call. If the Wi-Fi network is available, the Wi-Fi module 314 verifies a voice preference mode of the UE 202. The Wi-Fi module 314 may be configured to connect the VoNR call to the available Wi-Fi network on detecting the voice preference mode as Wi-Fi. The Wi-Fi module 314 may be further configured to connect the VoNR call to the available Wi-Fi network even the voice preference mode is indicated as cellular has a higher priority. Thus, the Wi-Fi module 314 connects the VoNR call to the available network on detecting the voice preference mode from at least one of the Wi-Fi network and the cellular network. The Wi-Fi module 314 connects the VoNR call or the 5G NR call using an internet bearer on a default internet quality of service (QoS) instead of a dedicated QoS, when the Wi-Fi network signal is degraded.

If the Wi-Fi network is not available, the communication module 304 is configured to utilize the DSDS module 316 for verifying availability of a DSDS feature. The DSDS feature enables the UE 202 to have two active SIMs where UE 202 could receive data on both the SIMs at the same time, but transmission is limited to only one SIM at a time. The DSDS module 316 may be configured to connect the VoNR call to a preferred primary subscriber identity module (SIM), where the primary SIM is allocated for a call. If the VoNR coverage of the primary SIM is weak, the DSDS module 316 may be configured to connect the VoNR call to a secondary SIM, where the secondary SIM is allocated for data services. The secondary SIM may be subscribed for data services using a data network of the secondary SIM.

Therefore, the communication module 304 is configured for establishing a call utilizing the Wi-Fi network or the DSDS feature when the 5G NR or the EPSFB calls are not available and if subscription is available.

In an embodiment, the Wi-Fi module 314 may be configured to connect the VoNR call in various non-limiting example scenarios using the internet bearer.
Scenario 1:
Consider that the voice call is on Wi-Fi, LTE leg has an issue such as congestion, and voice over NR is not supported (UE 202 determines using previous trials or UE 202 does not support voice over NR). Due to this condition, the Wi-Fi signal may be degraded, and the call cannot be moved to the LTE due to the issue on the LTE leg. Here, the UE 202 may enable 5G (if it is disabled due to issue on LTE leg), and move the call to 5G on the internet bearer.
Scenario 2:
Consider that the voice call is on Wi-Fi, IMS PDN has issue(s) on NR and LTE, and 5G SA and LTE mode is disabled. Due to this condition, the Wi-Fi signal may be degraded and the call cannot be moved to 5G and LTE as they are disabled. Here, the UE 202 may enable LTE and 5G, move the call to 5G or LTE on the internet bearer.
Scenario 3:
Consider that the voice call is on Wi-Fi and 5G cell does not support voice over PS session (VoPS). Due to this condition, the Wi-Fi signal may be degraded and the call cannot be moved to 5G. Here, the UE 202 may use the internet bearer to move the call from Wi-Fi to cellular.

Scenario 4:

Consider that the voice call is on Wi-Fi and 5G cell supports only EPSFB, and user is downloading big file and need to maintain good throughput. Due to this condition, the Wi-Fi signal may be degraded, and the call on cellular will move the UE 202 to LTE which degrade throughput. Here, the UE 202 may use the internet bearer to move the call from Wi-Fi to cellular.

In an embodiment, the fallback connection module 312 is configured to enable a UE initiated fallback (FB) procedure in the VoNR call. The fallback connection module 312 may be configured to initiate an EPSFB procedure without network support by means of few triggers.

The fallback connection module 312 may be stored or configured with predefined (e.g., specified) timer values such as a first timer and a second timer. Further, the first timer value and the second timer values may be assigned based on the extent level of the call failure rate and the EPSFB occurred in a particular location or time. For example, a lower value of the time taken for FB completion may be assigned to the first timer if the call failure rate is high in a particular location or time of the UE 202. In an embodiment herein, a higher value of the time taken for FB completion may be assigned to the first timer if the call failure rate is low in a particular location or time of the UE 202. The fallback connection module 312 may trigger the first timer and the second timer based on timer values for call failure rates and evolved packet system (EPS)/radio access technology (RAT) fallbacks (FB) which are stored in at least one database of the UE 202.

For example, the UE 202 may comprise a first database for maintaining the network supported EPSFBs and the average time taken for call connections. In an embodiment herein, the average time taken for a call connection could be the average over a period of time, which may be configured by the UE software. In an embodiment herein, the average time taken for a call connection could be the average over number of calls, which may be configured by the UE software. The UE 202 may further comprise a second database for maintaining the timer values such as the first timer T1 and the second timer T2 values. The T1 and T2 values may be configured based on results from the first database scanning.

The fallback connection module 312 triggers the first timer on initiating the VoNR call or 5G NR call or a call handover to the VoNR. The fallback connection module 312 verifies establishment of the media in the VoNR for detecting the VoNR call establishment during the first timer. If the media has established in the VoNR, then the first timer is automatically stopped. If the media has not been established in the VoNR, the fallback connection module 312 verifies expiration of the first timer and triggers the second timer for initiating the UE initiated FB procedure.

The fallback connection module 312 further enables the report module 310 to send at least one of the measurement report, the zero CQI report, an FB service request with a newly defined cause, a tracking area update (TAU) with capability change of the UE 202 or a combination of the above, to the network to inform a need for the FB.

If the network has initiated the call handover to the LTE network based on the measurement report, the fallback connection module 312 connects the VoNR call to the LTE network. If the network has not initiated the call handover to the LTE network, the fallback connection module 312 verifies expiration of the second timer. If the second timer has expired, the fallback connection module 312 initiates a manual scan for connecting the VoNR call to the LTE network or other legacy systems.

FIG. 3 illustrates various example elements of the UE 300, but it is to be understood that various embodiments are not limited thereon. In various embodiments, the UE 300 may include less or a greater number of elements/units. Further, the labels or names of the modules are used only for illustrative purpose and does not limit the scope of the disclosure herein. One or more modules may be combined together to perform same or substantially similar function in the UE 300.

Figure 5:
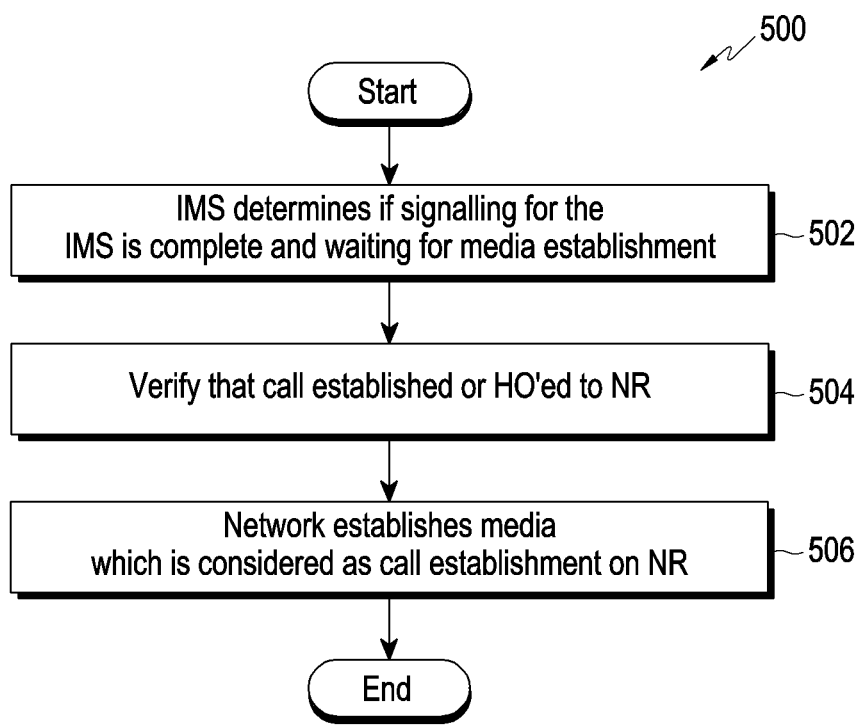
FIG. 5 is a flowchart illustrating an example call establishment procedure, according to various embodiments.

FIG. 5 is a flowchart illustrating an example call establishment procedure 500 according to various embodiments. The call establishment and handover to NR is related to the media establishment on NR. The handover is related to media bearer movement to NR from other RAT (for example, ePDG). The call establishment is related to a media bearer establishment in NR. The IP multimedia subsystem (IMS) determines if signalling for the IMS is complete and waiting for the media establishment, as depicted in operation 502. The IMS further verifies that the call has established or handed over to the NR, as depicted in operation 504. The IMS sends provisional acknowledgement (PRACK) and receives 200 OK which indicates that the network establishes media and may be considered as call establishment on NR is determined, as depicted in operation 506. The PRACK is a SIP message which is used to acknowledge the receipt of a reliable transfer of provisional response containing the request. The 200 OK is a SIP response code which indicates that the request has succeeded.

The various operations in method 500 may be performed in the order presented, in a different order or simultaneously. Further, in various embodiments, some actions listed in FIG. 5 may be omitted.

Figure 6:
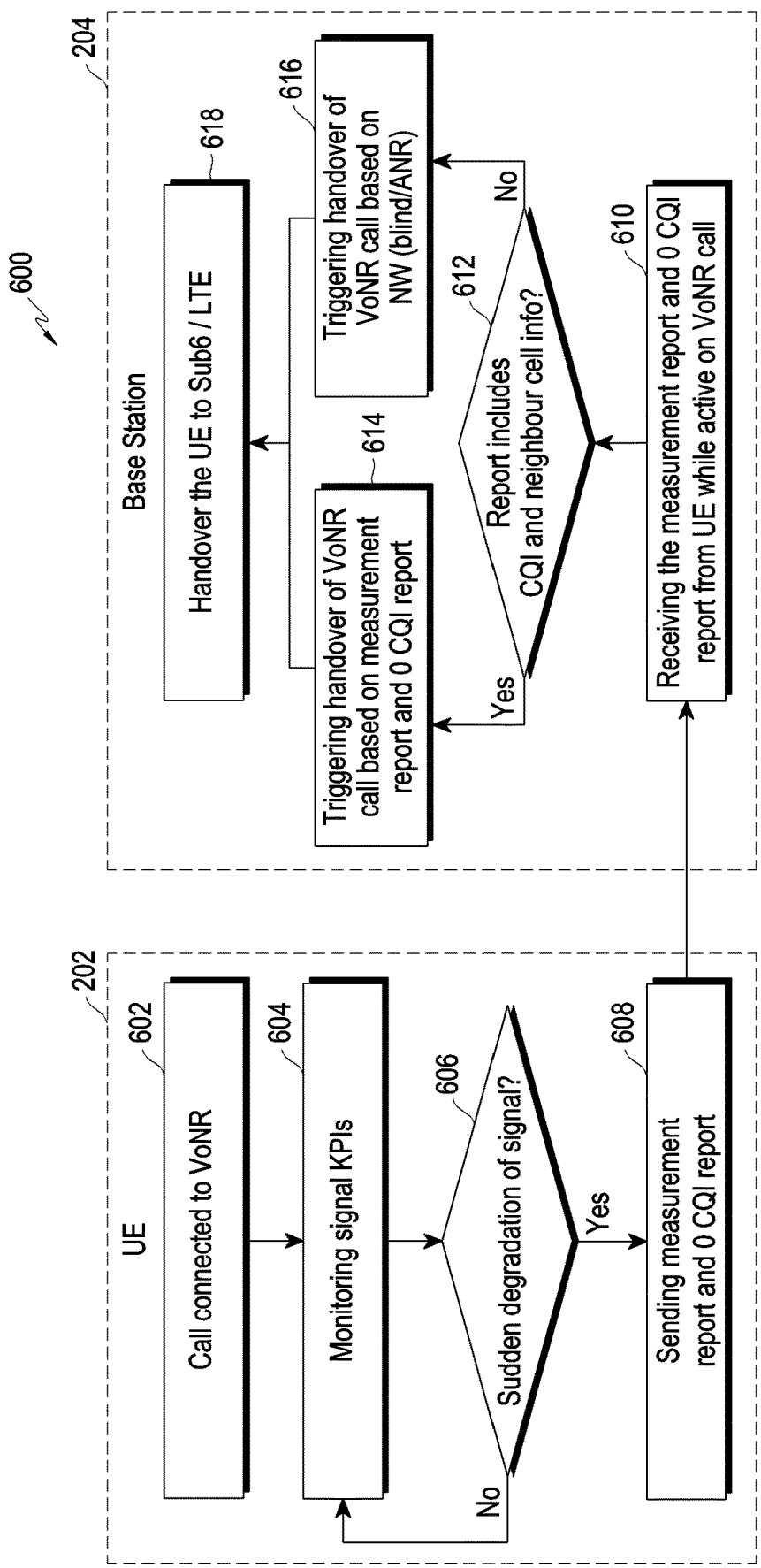
FIG. 6 is a flowchart illustrating an example method for managing the VoNR calls, according to various embodiments.

FIG. 6 is a flowchart illustrating an example method 600 for managing the VoNR calls according to various embodiments. The method 600 includes the UE 202 connecting to a VoNR call, as depicted in operation 602. The signal detection module 308 of the UE 202 monitors the signal KPIs of the NR network during the VoNR call, as depicted in operation 604. Thereafter, the signal detection module 308 of the UE 202 verifies whether there is a sudden degradation of a signal parameter due to line of sight loss, as depicted in operation 606.

The report module 310 of the UE 202 sends the measurement report and the zero CQI report, as depicted in operation 608, if there is signal degradation. The measurement report and the zero CQI report are sent to the base station 204. If there is no signal degradation, the method 600 continues to operation 604, for monitoring the signal KPIs.

The base station 204 receives the measurement report and the zero CQI report from the UE 202 while active on the VoNR call, as depicted in operation 610. Verifying, by the base station 204, whether the UE 202 sent report comprises the zero CQI report and the neighbour cell information, as depicted in operation 612.

The base station 204 triggers the handover of the VoNR call to the neighbour cell based on the measurement report, as depicted in operation 614. The call handover is triggered, if the zero CQI report is received and the measurement report includes the neighbour cell information. Otherwise, the base station 204 triggers the handover of the VoNR call based on the network using an automatic neighbour relation (ANR) feature, as depicted in operation 616, e.g., if the zero CQI report is not received and the measurement report does not include the neighbour cell information. The ANR feature enables the UE 202 to associate with the automatic configuration of neighbour cell relations at a given base station. The UE 202 is handed over, by the base station 204, to the Sub-6 frequency/LTE for continuing the VoNR call, as depicted in operation 618.

The various operation in method 600 may be performed in the order presented, in a different order or simultaneously. Further, in various embodiments, some operations listed in FIG. 6 may be omitted.

Figure 7:
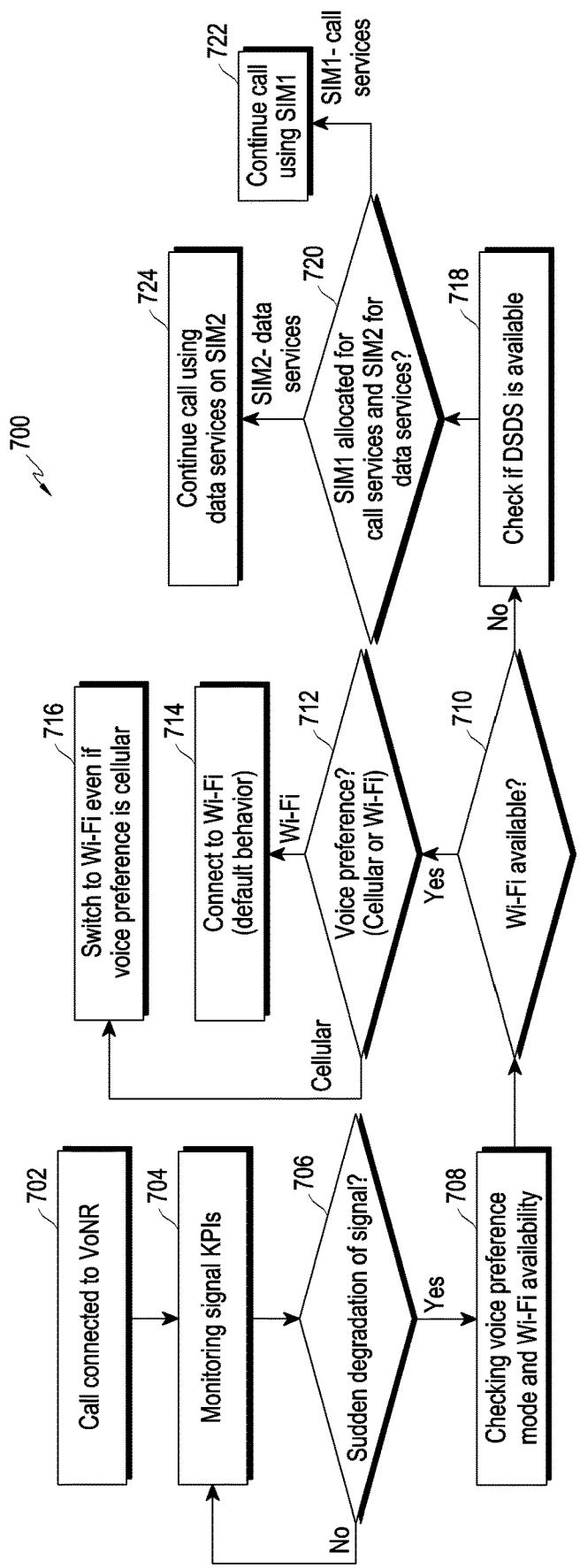
FIG. 7 is a flowchart illustrating an example method for managing the VoNR calls using the Wi-Fi network or the DSDS feature, according to various embodiments.

FIG. 7 is a flowchart illustrating an example method 700 for managing the VoNR calls using the Wi-Fi network or the DSDS feature according to various embodiments. The method 700 includes connecting, by the UE 202, to a VoNR call, as depicted in operation 702. The signal detection module 308 of the UE 202 monitors the signal KPIs of the NR network during the VoNR call, as depicted in operation 704. The signal detection module 308 of the UE 202 verifies whether there is a sudden degradation of a signal parameter due to line of sight loss, as depicted in opeation 706. The communication module 304 of the UE 202, checks voice preference mode and Wi-Fi availability for signal degradation, as depicted in operation 708. If there is no signal degradation, the method 700 continues to operation 704, e.g., monitoring the signal KPIs. The Wi-Fi module 314 of the UE 202 verifies whether the Wi-Fi network is available, as depicted in operation 710.

If the Wi-Fi network is available, the Wi-Fi module 314 of the communication module 304 checks voice preference mode; e.g., whether the voice preference is cellular or Wi-Fi, as depicted in operation 712. Connecting, by the Wi-Fi module 314 of the communication module 312, the VoNR call to the available Wi-Fi network as a default behaviour, on detecting the voice preference mode as Wi-Fi, as depicted in operation 714.

The Wi-Fi module 314 of the communication module 304 connects the VoNR call to the available Wi-Fi network even if the voice preference indicates cellular has a higher priority, as depicted in operation 716. If the Wi-Fi network is not available, the method 700 includes the DSDS module 316 of the communication module 304 verifying the availability of the DSDS feature, as depicted in operation 718. The method 700 includes identifying subscription information of the primary SIM (SIM1) and secondary SIM (SIM2), as depicted in operation 720, if the DSDS feature is available. If SIM1 is allocated for the call, the DSDS module 316 of the communication module 304 communicates the VoNR call to the preferred SIM1 which is allocated for the call, as depicted in operation 722. If the VoNR coverage of the primary SIM is weak and the SIM2 is allocated for data services, the DSDS module 316 of the communication module 304 connects the VoNR call using data services on SIM2 as a Wi-Fi, as depicted in operation 724.

The various operations in method 700 may be performed in the order presented, in a different order or simultaneously. Further, in various embodiments, some operations listed in FIG. 7 may be omitted.

Figure 8A:
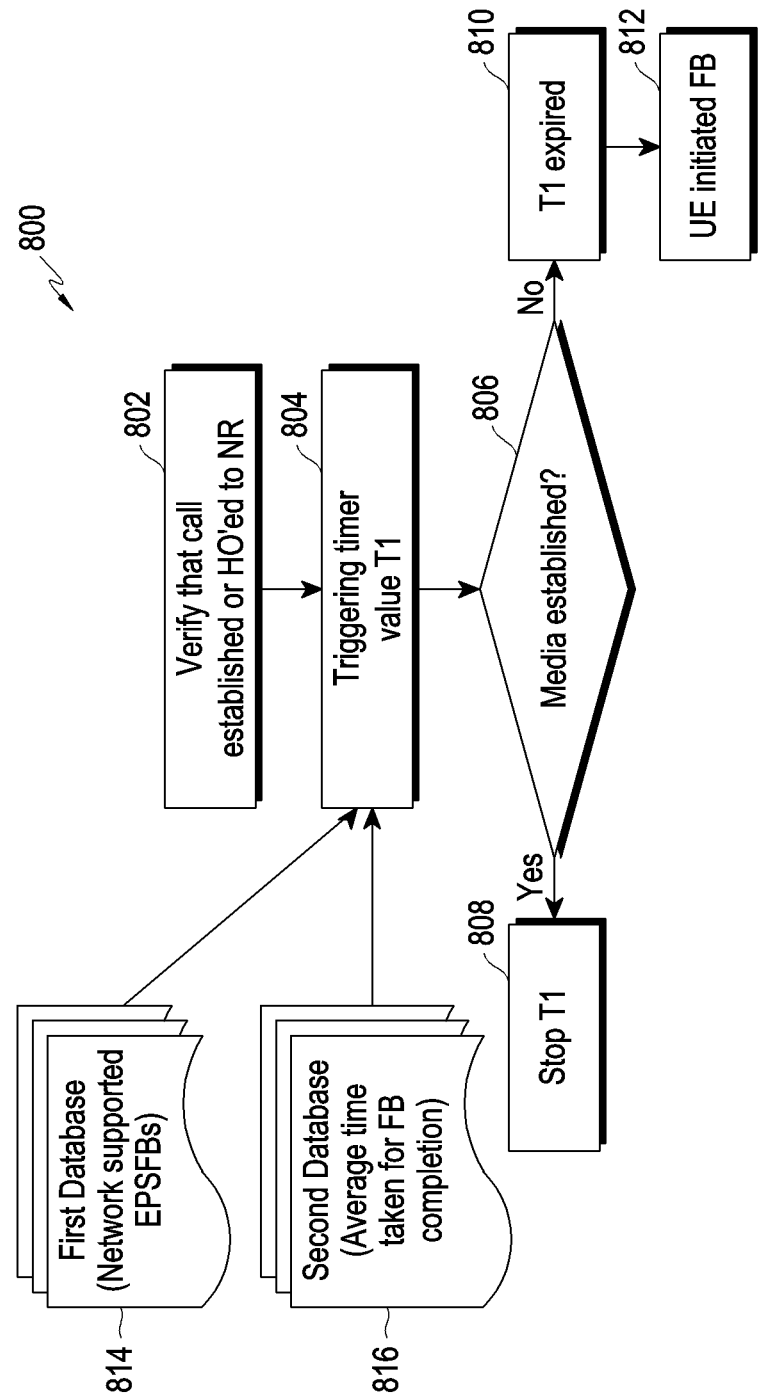
FIGS. 8A and 8B are flowcharts illustrating an example method for UE initiated fallback (FB) procedure in a VoNR call, according to various embodiments.
Figure 8B:
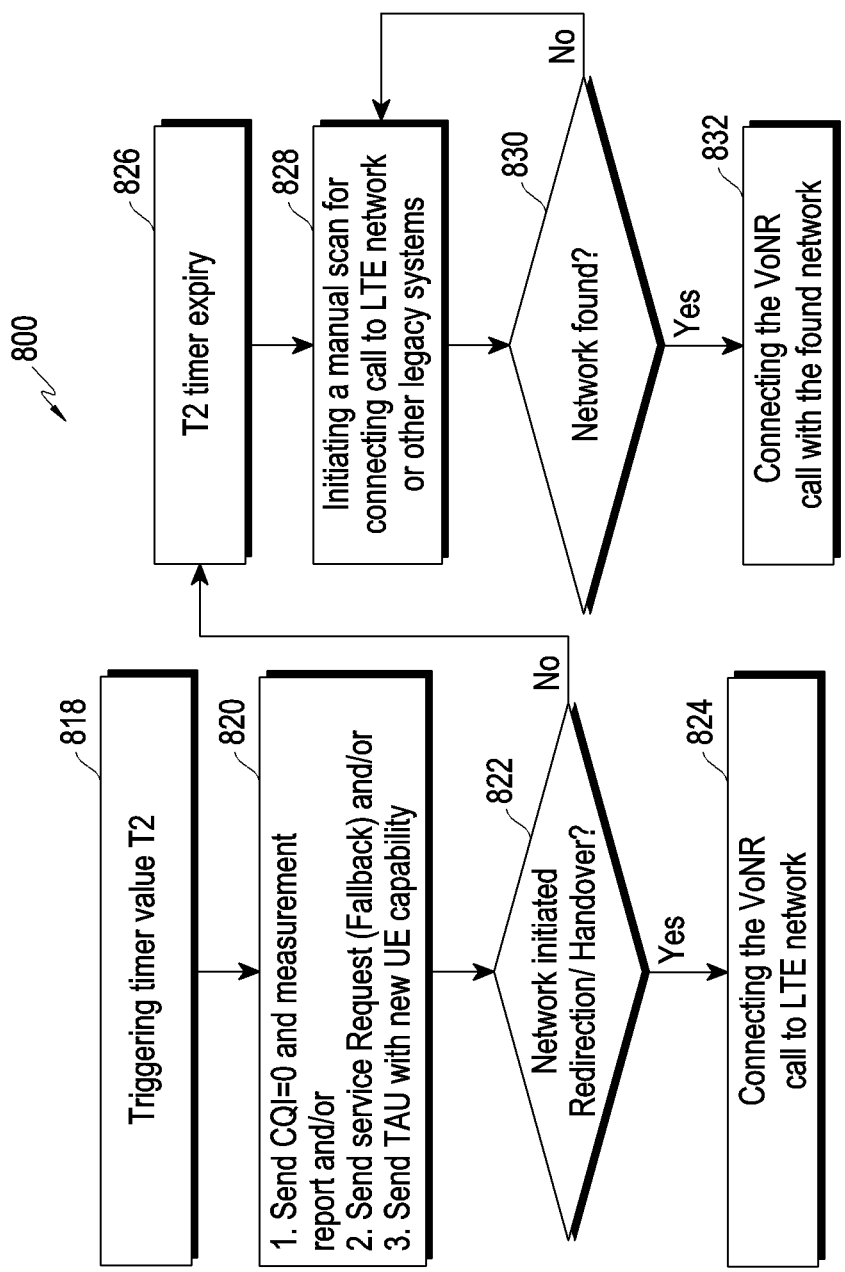

FIGS. 8A and 8B are flowcharts illustrating an example method 800 for UE initiated fallback (FB) procedure in a VoNR call according to various embodiments. The method 800 includes the UE 202 verifying that a VoNR call has established or a call is handed over to the VoNR, as depicted in operation 802. When the call is initiated on VONR or handed over to the VoNR, the fallback connection module 312 triggers the timer value T1, as depicted in operation 804.

The UE 202 may maintain the first database 814 for network supported EPSFBs. Thus, the EPS/RAT FB may be checked from the first database 814 and the average time taken for the corresponding FB completion may be taken from the second database 816 and may be assigned to the T1 value. Further, if the call failure rate is high in a particular location/time, a lower value may be assigned to the timer T1. If the call failure rate is low, a higher value may be assigned to the timer T1.

In an embodiment, if the database is not available, the UE 202 may start timer T1 based on learning. For example, normally the network takes 4 seconds for a fallback completion, and therefore, the UE 202 may start the timer for 6-7 seconds.

In an embodiment herein, if the database is available and the network also supports voice over NR, the UE 202 may start timer for 10 seconds for example, as it is possible that there is an issue with the QoS establishment in the NR and the network may be retrying for connecting the call on VoNR.

In an embodiment herein, if the UE 202 does not have learning or database, the UE 202 may start T based on the configured value.

The fallback connection module 312 verifies establishment of the media in the VoNR for detecting the VoNR call establishment or the call handover to the VoNR, as depicted in operation 806. The fallback connection module 312 automatically stops the timer value T1, if the media has established in the VoNR, as depicted in operation 808. The fallback connection module 312 verifies an expiry of the timer value T1, as depicted in operation 810, if the media has not been established in the VoNR. The fallback connection module 312 initiates the fallback procedure, as depicted in operation 812.

The UE initiated fallback procedure is continued in FIG. 8B, wherein the fallback connection module 312 triggers the second timer value T2 on expiration of the first timer value T1, as depicted in operation 818. The fallback connection module 312 verifies if the network supports the UE 202 assisted EPS/RAT fallback, checks the database for the average time taken for FB completion and assigns it to T2. T1 and T2 do not exceed a normal call connectivity time that is seen on average.

The report module 310 informs a need for the FB to a network by sending at least one of the measurement report, the zero CQI, an FB service request with a newly defined cause, and a TAU with capability change of the UE 202 or a combination of the above, as depicted in operation 820.

The fallback connection module 312 verifies whether the network has initiated the call handover to the LTE network based on the at least one of the measurement report, the zero CQI, the FB service request with the newly defined cause, and the TAU with capability change of the UE 202, as depicted in operation 822.

The fallback connection module 312 connects the VoNR call to an LTE network if the network has initiated the call handover to the LTE network, as depicted in operation 824. If the network has not initiated the call handover to the LTE network, the fallback connection module 312 verifies expiration of the second timer value T2, as depicted in operation 826. The fallback connection module 312 initiates a manual scan on expiration of the second timer T2, as depicted in operation 828, for connecting the call to the LTE network or other legacy systems such as Long-Term Evolution radio access technology (LTE RAT), universal mobile telecommunications system (UMTS) RAT, global system for mobile communication (GSM) RAT etc.

The fallback connection module 312 verifies if the LTE network found with VoPS or circuit switched fallback (CSFB) support or GSM/wideband code division multiple access (WCDMA) network, as depicted in operation 830.

The fallback connection module 312 connects the VoNR call with the found network such as VoLTE/CSFB call on LTE (if LTE found) or CS call on GSM/UMTS, as depicted in operation 832. If the network is not found, the method 800 continues to operation 828 for a manual scan.

The various operations in method 800 may be performed in the order presented, in a different order or simultaneously. Further, in various embodiments, some operations listed in FIG. 8 may be omitted.

The embodiments disclosed herein may be implemented through at least one software program running on at least one hardware device and performing network management functions to control the network elements. The modules shown in FIGS. 2 and 3 include blocks which may be at least one of a hardware device, or a combination of hardware device and software module.

The disclosure describes a UE based solution for fallback to LTE/legacy RAT during the VoNR call, while the signal conditions are weak. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in various embodiments through or together with a software program written in e.g. very high speed integrated circuit hardware description language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the disclosure may be implemented on different hardware devices, e.g. using a plurality of CPUs.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for managing voice/video over new radio (VoNR) calls, the method comprising:
    detecting, by a user equipment (UE), a signal deterioration during a VoNR call based on at least one of absolute signal parameters and derived parameters;
    sending, by the UE, a zero channel quality indicator (CQI) report and a measurement report to a base station on detecting the signal deterioration, wherein the measurement report comprises at least one of at least one neighbour new radio (NR) cell information, and at least one neighbour long-term evolution (LTE) cell information;
    receiving, by the UE, a handover trigger for the VoNR call from the base station, based on the zero CQI report and the measurement report; and
    continuing, by the UE, at least one of the VoNR call over a neighbour NR cell and the VoNR call as a voice over long-term evolution (VoLTE) call over a neighbour LTE cell, based on the handover trigger for the VoNR call.

2. The method as claimed in claim 1, wherein the method further comprises: continuing, by the UE, at least one of the VoNR call and the VoLTE call using at least one of a UE initiated fallback (FB) procedure, a Wi-Fi network or a dual SIM dual standby (DSDS) feature, and an internet bearer.

3. The method as claimed in claim 1, wherein the method further comprises:
    transmitting, by the UE to the base station, the zero CQI report and the measurement report indicating the signal deterioration during the VoNR call,
    wherein the handover of the UE to at least one of the neighbour NR cell and the neighbour LTE cell is triggered, to handover the VoNR call based on the zero CQI report and the measurement report.

4. The method as claimed in claim 1, wherein the method further comprises detecting the signal deterioration based on the VoNR call not being established on the NR cell within the expiry of a timer, where the timer is configured at the UE.

5. The method as claimed in claim 4, wherein the timer is determined at the UE based on at least one of an average call success time in good signal conditions, an average call success time in mid signal conditions and an average call success time in weak signal conditions.

6. The method as claimed in claim 4, wherein the timer is determined at the UE based on a call success rate on at least one of a particular cell, a particular time of the day, and at a particular location.

7. The method as claimed in claim 4, wherein a lowest time value is assigned to the timer based on the call success rate being lower than a specified value, and a highest time value is assigned to the timer based on the call success rate being higher than the specified value.

8. The method as claimed in claim 1, wherein the absolute signal parameters comprise at least one of a reference signal received power (RSRP), a reference signal received quality (RSRQ), and a signal-to-interference-plus-noise ratio (SINR).

9. The method as claimed in claim 1, wherein the derived parameters comprise at least one of a block error rate (BLER), and a path-loss.

10. The method as claimed in claim 2, wherein continuing, by the UE, the VoNR call using the UE initiated fallback (FB) procedure, the method further comprising:
    triggering, by the UE, a first timer on initiating the VoNR call or a call handover to the VoNR;
    verifying, by the UE, establishment of a media in the VoNR for detecting the VoNR call establishment or the call handover to the VoNR;
    stopping, by the UE, the first timer based on the media being established in the VoNR;
    verifying, by the UE, an expiry of the first timer based on the media not being established in the VoNR;
    triggering, by the UE, a second timer on expiration of the first timer for initiating the UE initiated FB procedure;
    sending, by the UE, at least one of the zero CQI report, the measurement report, an FB service request with a newly defined cause, and a tracking area update (TAU) with capability change of the UE to inform a need for the FB to a network;

connecting, by the UE, the VoNR call to an LTE network based on the network initiating the call handover to the LTE network based on the at least one of the zero CQI report, the measurement report, the FB service request with the newly defined cause, and the TAU with capability change of the UE;

verifying, by the UE, an expiry of the second timer based on the network not initiating the call handover to the LTE network; and initiating, by the UE, a manual scan on expiration of the second timer for connecting the call to the LTE network or other legacy systems.

11. The method as claimed in claim 10, wherein the method further comprises triggering the first timer and the second timer based on timer values of at least one of call failure rates, evolved packet system fallbacks (EPSFB), and radio access technology fallbacks (RAT FB) stored in at least one database of the UE.

12. The method as claimed in claim 10, wherein a first value of the time taken for FB completion is assigned to the first timer based on a call failure rate being higher than a specified value in a particular location or time of the UE, wherein a second value of the time taken for FB completion is assigned to the first timer based on the call failure rate being lower than the specified value in the particular location or time of the UE, wherein, the first value of the time taken for FB completion is lower than the second value of the time taken for FB completion.

13. The method as claimed in claim 2, wherein continuing, by the UE, the VoNR call using the Wi-Fi network or the DSDS feature, comprises:

verifying, by the UE, availability of the Wi-Fi network;
verifying, by the UE, a voice preference mode of the UE based on the Wi-Fi network being available;
connecting, by the UE, the VoNR call to the available Wi-Fi network on detecting the voice preference mode even if the preference indicates that a cellular network has a higher priority;
verifying, by the UE, availability of the DSDS based on the Wi-Fi network not being available;
connecting, by the UE, the VoNR call to a preferred primary subscriber identity module (SIM) allocated for a call; and
connecting, by the UE, the VoNR call to a secondary SIM allocated for data services based on the VoNR coverage of the primary SIM being weak, and the secondary SIM being subscribed for data services using a data network of the secondary SIM.

14. The method as claimed in claim 13, wherein the method further comprises connecting the VoNR call to the available Wi-Fi network, on detecting the voice preference mode from at least one of the Wi-Fi network and the cellular network.

15. The method as claimed in claim 2, wherein the method further comprises continuing, by the UE, the VoNR call using the internet bearer on a default internet quality of service (QoS) based on the Wi-Fi network signal being degraded.

16. A user equipment (UE) for managing voice/video over new radio (VoNR) calls, the UE comprising:
a memory;
communication circuitry; and
at least one processor configured to:
 detect a signal deterioration during a voice/video over new radio (VoNR) call based on at least one of absolute signal parameters and derived parameters;
 send a zero channel quality indicator (CQI) report and a measurement report to a base station on detecting the signal deterioration, wherein the measurement report comprises at least one of at least one neighbour new radio (NR) cell information and at least one neighbour long-term evolution (LTE) cell information;
 receive a handover trigger for the VoNR call from the base station, based on the zero CQI report and the measurement report; and
 continue at least one of the VoNR call over a neighbour NR cell and the VoNR call as a voice over long-term evolution (VoLTE) call over a neighbour LTE cell, based on the handover trigger for the VoNR call.

17. The UE as claimed in claim 16, wherein the processor is further configured to continue at least one of the VoNR call and the VoLTE call using at least one of a UE initiated fallback (FB) procedure, a Wi-Fi network or a dual SIM dual standby (DSDS) feature, and an internet bearer.

18. The UE as claimed in claim 16, wherein the processor is further configured to transmit the zero CQI report and the measurement report indicating the signal deterioration during the VoNR call to the base station, wherein the handover of the UE to at least one of the neighbour NR cell and the neighbour LTE cell is triggered, to handover the VoNR call based on the zero CQI report and the measurement report.

19. The UE as claimed in claim 16, wherein the processor is further configured to detect the signal deterioration based on the VoNR call not being established on the NR cell within the expiry of a timer, where the timer is configured at the UE.

20. The UE as claimed in claim 16, wherein the absolute signal parameters comprise at least one of a reference signal received power (RSRP), a reference signal received quality (RSRQ), and a signal-to-interference-plus-noise ratio (SINR), wherein the derived parameters comprise at least one of a block error rate (BLER), and a path-loss.

* * * * *